Nov. 8, 1955     H. O. HOLADAY ET AL     2,722,828
MEANS FOR TESTING THE CONDITION
OF BALANCE OF ROTATING BODIES
Filed Nov. 5, 1951                      5 Sheets—Sheet 3
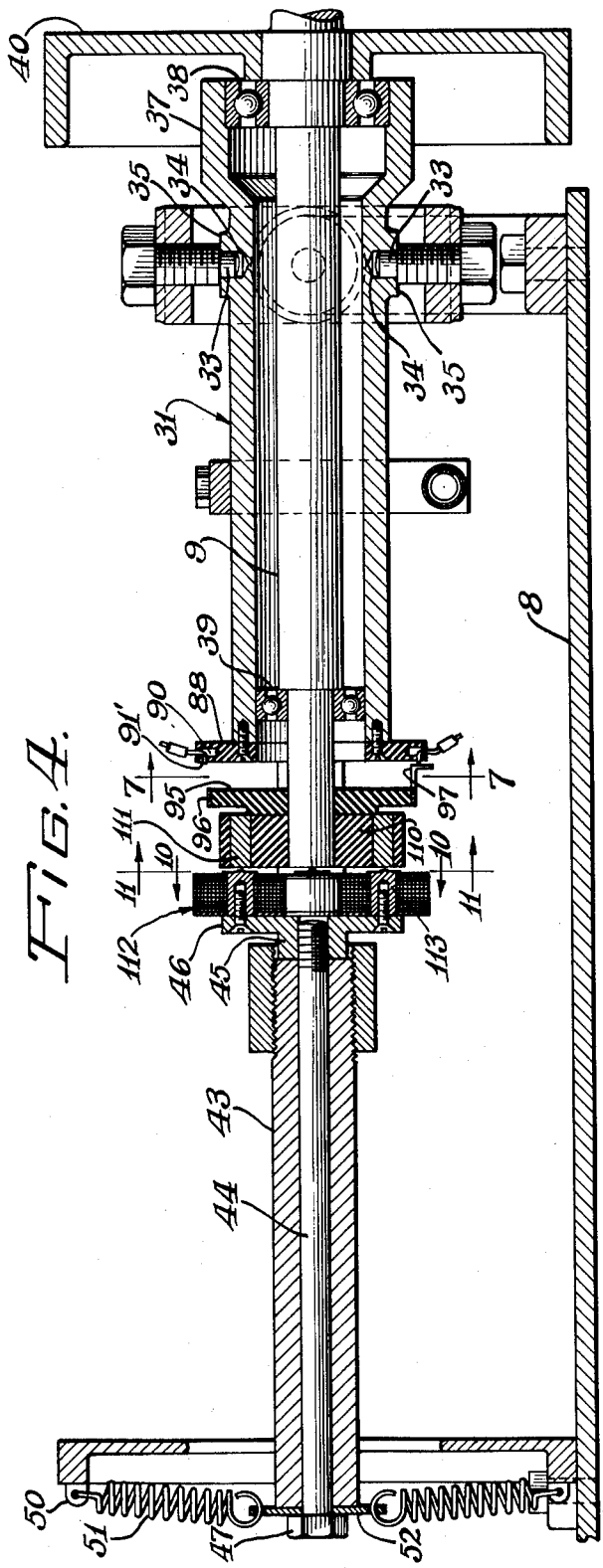
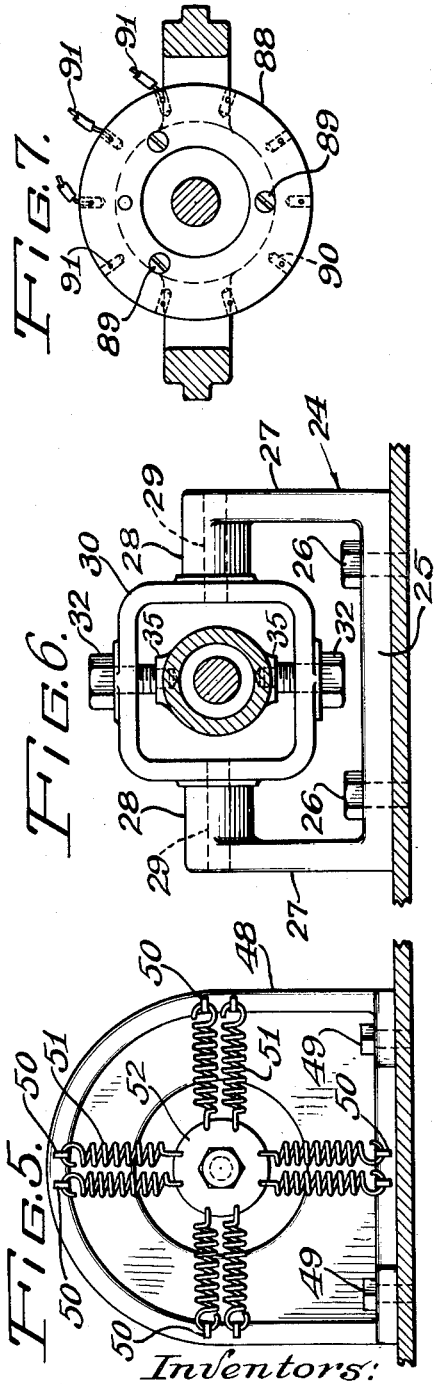
Inventors:
Harold O. Holaday
Charles W. MacMillan
By Gary, Desmond & Parker,
Attys.

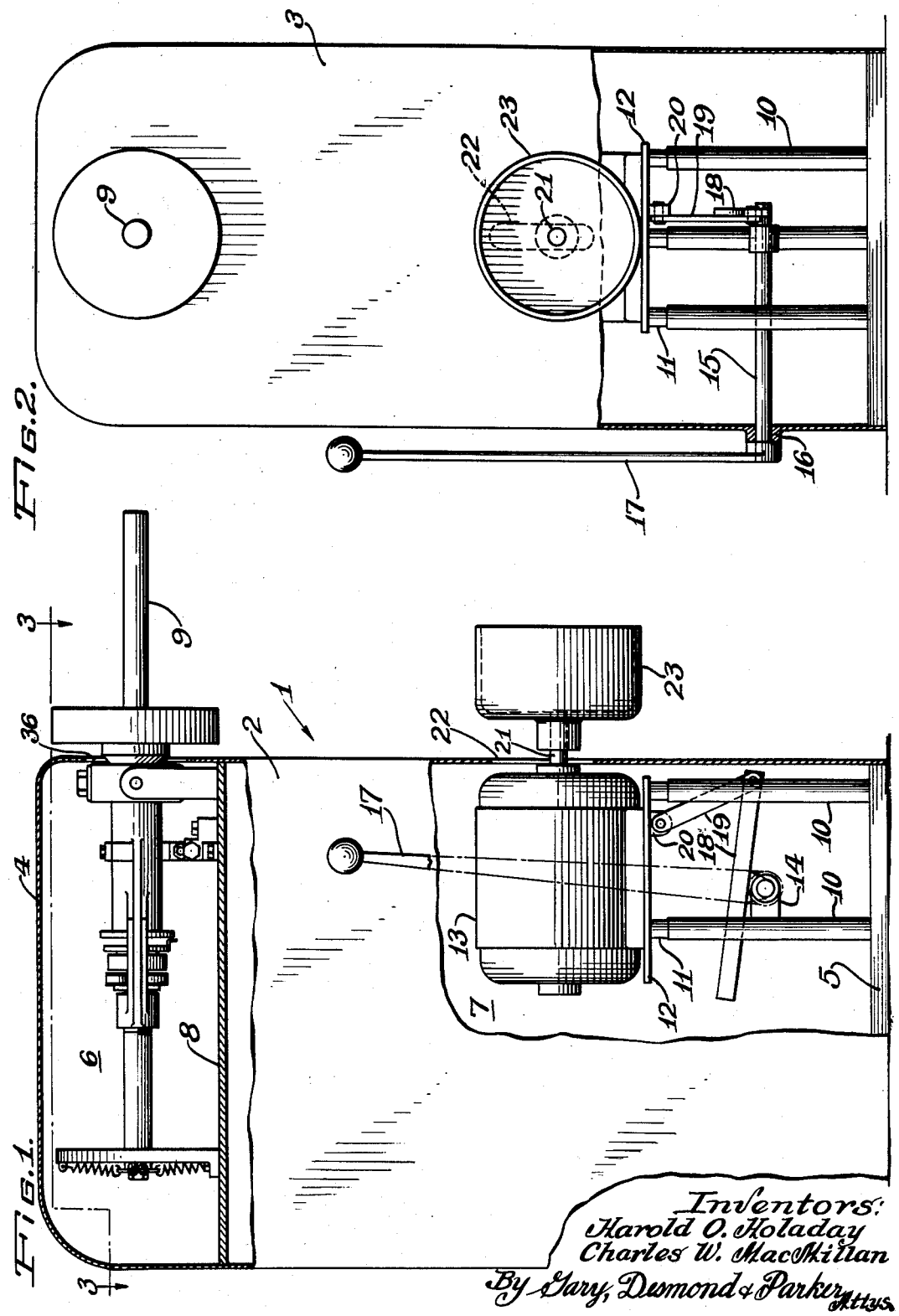

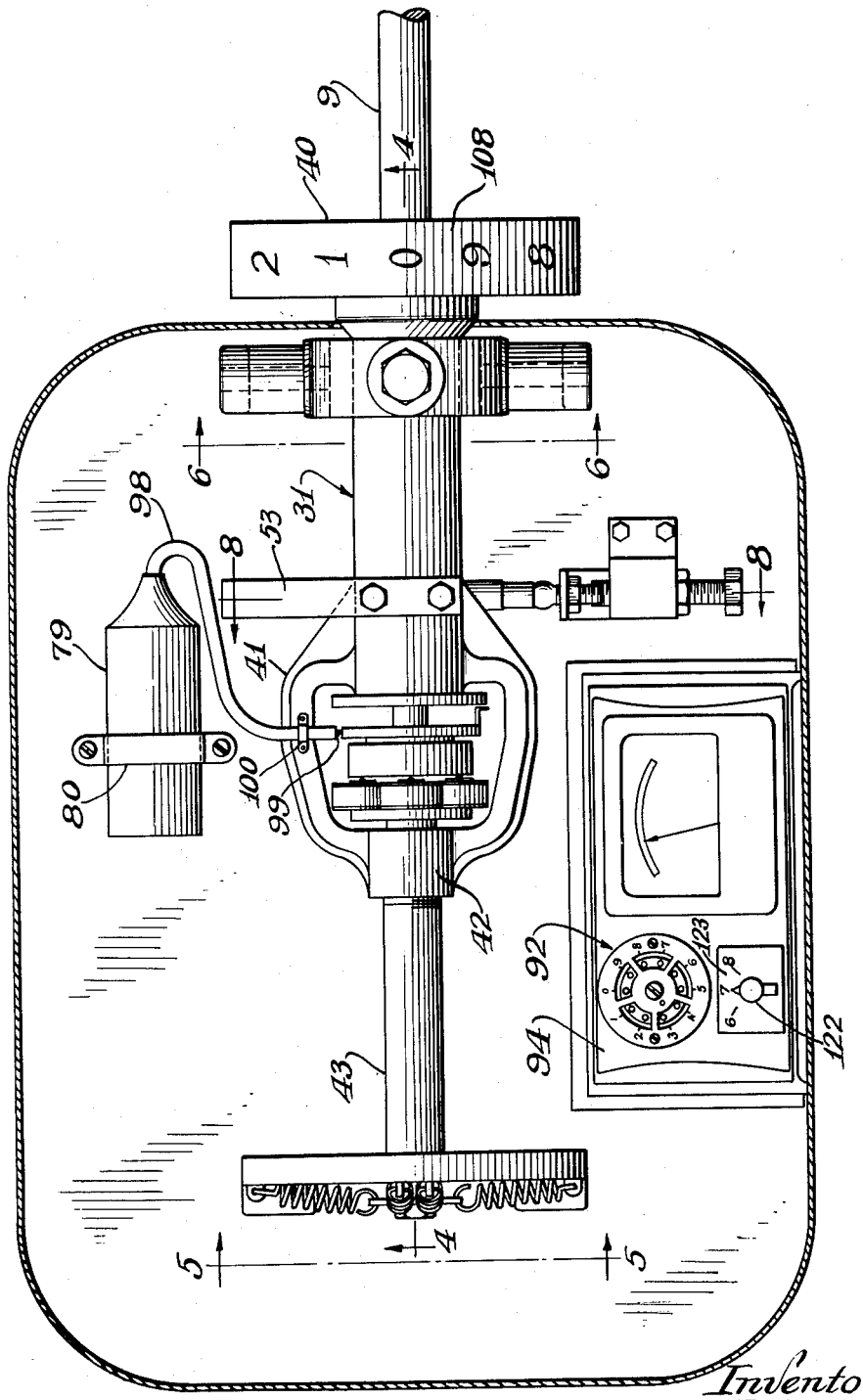

Nov. 8, 1955 — H. O. HOLADAY ET AL — 2,722,828
MEANS FOR TESTING THE CONDITION
OF BALANCE OF ROTATING BODIES
Filed Nov. 5, 1951 — 5 Sheets-Sheet 4

Inventors:
Harold O. Holaday
Charles W. MacMillan
By Gary, Desmond & Parker
Attys.

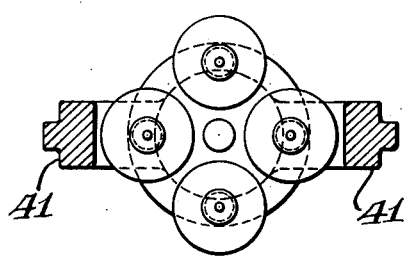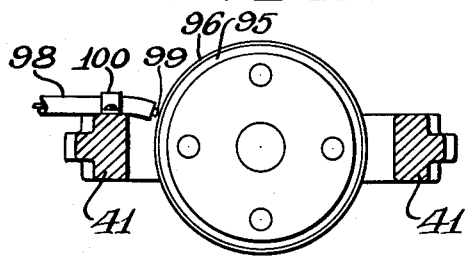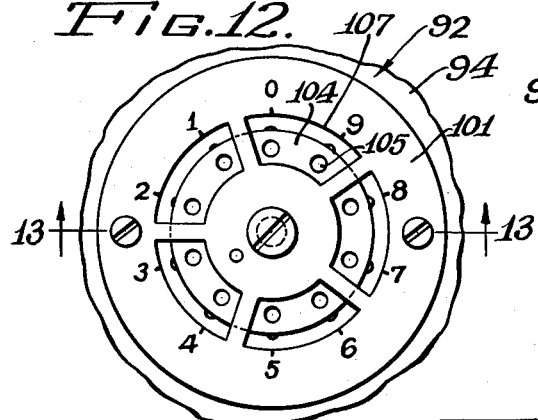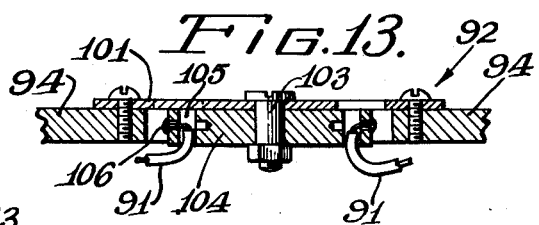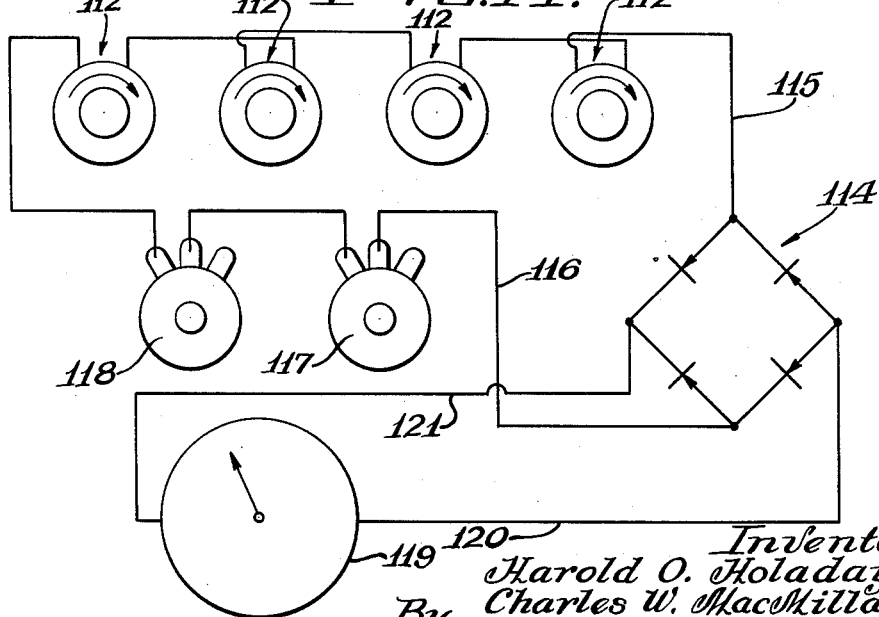

United States Patent Office 2,722,828
Patented Nov. 8, 1955

2,722,828

MEANS FOR TESTING THE CONDITION OF BALANCE OF ROTATING BODIES

Harold O. Holaday and Charles W. MacMillan, Rock Island, Ill., assignors to Bear Manufacturing Company, Rock Island, Ill., a corporation of Delaware Application November 5, 1951, Serial No. 254,826

4 Claims. (Cl. 73—66)

This invention relates to a device for testing rotating bodies to ascertain dynamic and static balance, and determine the location and degree of dynamic unbalance if the body is unbalanced.

One of the important features of the invention resides in the provision of a machine for testing the condition of balance or unbalance of rotating bodies, particularly, automobile wheels, the machine being characterized by its simplicity and ease of operation.

Another important feature of the invention resides in the provision of a machine of the class described which is so constructed and can be so operated as to introduce no intrinsic errors of balance or unbalance originating in the machine itself which may affect the accuracy of the determination of balance or unbalance of the body under test.

Other objects, advantages and features of the invention will be apparent from the accompanying drawings and following detailed description.

In the drawings, Fig. 1 is a side elevational view of our testing machine, parts being broken away and parts being shown in section.

Fig. 2 is a front elevational view of the machine, parts being broken away.

Fig. 3 is a top plan sectional view of the machine taken on line 3—3 of Fig. 1.

Fig. 4 is a detailed sectional view taken on line 4—4 of Fig. 3.

Fig. 5 is a detailed end elevational view looking in the direction of the arrows 5—5 in Fig. 3, illustrating the floating mounting of one end of the test assembly.

Fig. 6 is a transverse detailed sectional view taken on line 6—6 of Fig. 3.

Fig. 7 is a transverse detailed sectional view taken on line 7—7 of Fig. 4.

Fig. 10 is a transverse sectional view taken on line 10—10 of Fig. 4 illustrating the pick-up coils employed in determining the degree of dynamic unbalance.

Fig. 11 is a transverse sectional view taken on line 11—11 of Fig. 4 illustrating the rotating permanent magnets for energizing the pick up coils illustrated in Fig. 10.

Fig. 12 is an enlarged front face view of the unbalance indicator.

Fig. 13 is a detailed sectional view taken on line 13—13 of Fig. 12.

Fig. 14 is a schematic wiring diagram of the pick-up and measuring circuit employed in the machine.

Figure 8:
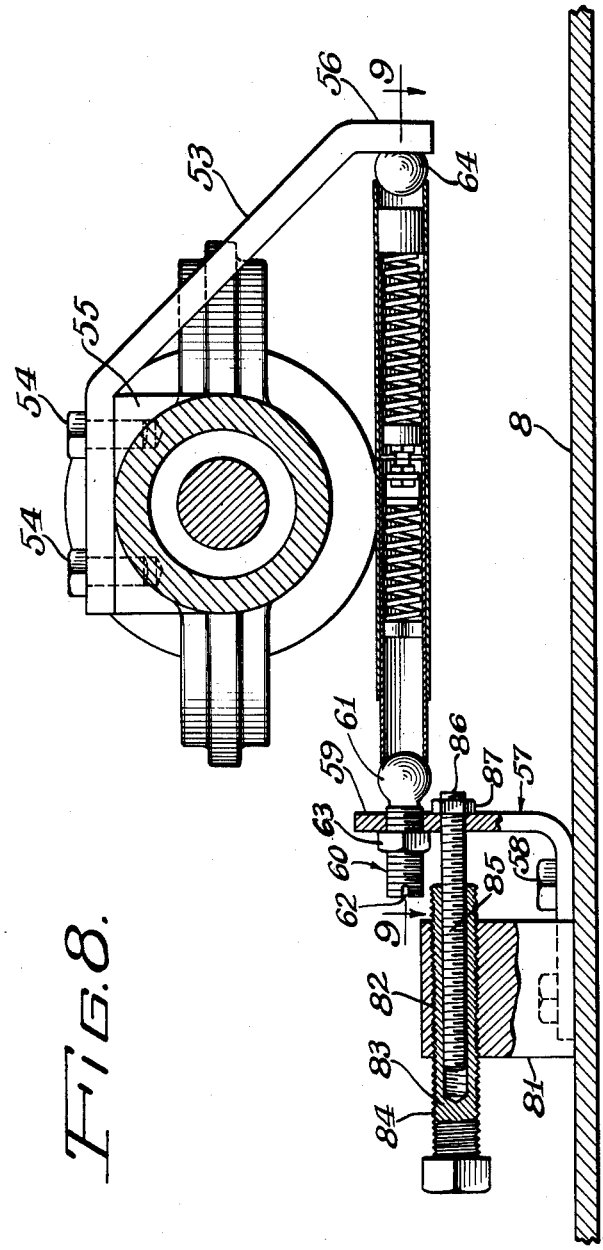
Fig. 8 is a transverse sectional view taken on line 8—8 of Fig. 3.
Figure 9:
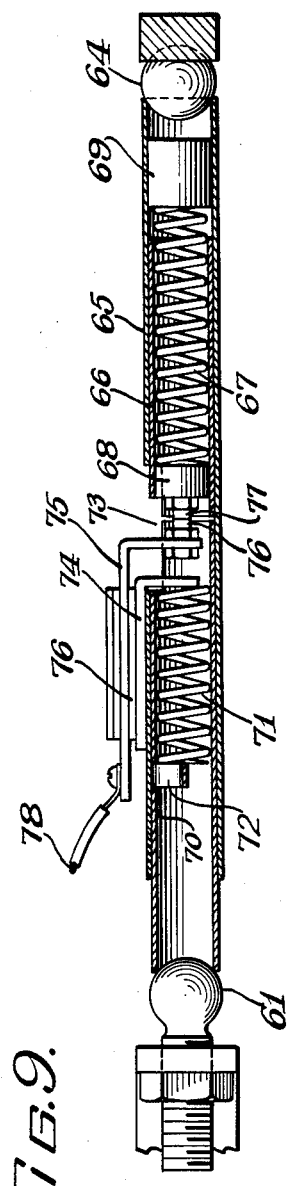
Fig. 9 is an enlarged detailed sectional view of the breaker tube taken on line 9—9 of Fig. 8.

Referring in detail to the drawings, 1 indicates a housing having side walls 2, end walls 3, top 4 and bottom 5. The housing is divided into two compartments 6 and 7 by a horizontal partition or platform 8. A shaft 9 projects from the upper compartment 6 and, as will be hereinafter more fully described, said shaft is adapted to carry the body, an automobile wheel, for instance, whose state of balance is to be determined.

In the lower compartment 7 three tubular guide members 10 are mounted upon bottom 5 and extend vertically upwardly. The tubular members 10 are adapted for the slidable reception of rods 11 which are telescopically positioned in the tubular members. Rods 11 support, at their upper ends, a platform 12 upon which an electric motor 13 is mounted. One of the rods 10 carries a bearing 14 in which a shaft 15 is journaled, the opposite end of said shaft being journaled in bearing 16 carried by a side wall 2. A control lever arm 17 is mounted upon the projecting end of shaft 15 exteriorly of the housing whereby said shaft may be rocked. An arm 18 is rigidly secured intermediate its length to shaft 15 whereby rotation of said shaft cants said arm. A link 19 is pivotally connected at one end to arm 18 and at its opposite end it is pivoted to a lug 20 mounted upon the bottom of platform 12. Motor shaft 21 projects through a slot 22 provided in an end wall 3 and carries, exteriorly of said wall, a friction drive pulley 23.

The arrangement is such that when a body such as an automobile wheel carrying its tire is mounted upon shaft 9, the tread of the tire will be positioned above the friction drive pulley 23. With motor 18 in operation, the control arm 17 may be manipulated to rock shaft 15, thus swinging arm 18, and through the agency of link 19, raising platform 12 and its carried motor 13. Shaft 21 moves vertically through slot 22 and the spinning pulley 23 is brought into frictional contact with the tread of the tire of the wheel whose balance is to be tested. The wheel is thereby rotated and, as will be hereinafter more fully described, when it reaches a predetermined speed, arm 17 may be manipulated to lower pulley 23 whereby the wheel under test will freely rotate under its own inertia.

A yoke 24 is mounted upon the supporting partition 8 and is positioned within the upper compartment 6. The yoke 24 comprises a U-shaped member, the base 25 of which is secured by means of screws 26 to the partition member 8. The opposite upright portions 27 of the yoke carry spaced bearings 28 which are adapted for the reception of pins 29 rotatably positioned in said bearings. The inner ends of the spaced pins 29 are secured to a rocking frame 30, the arrangement being such that the frame 30 may rock in a vertical plane about the axis of the pins 29.

A tubular housing 31 is positioned within the rockable frame 30, said frame carrying projecting screws 32 which terminate in bearing pins 33 of relatively restricted diameter. The screws 32 are in vertical alignment with each other and the pins 33, spaced from each other vertically, are adapted to register with apertures 34 provided in bosses 35 formed on the upper and lower portions of the tubular housing 31 adjacent one of its ends. The arrangement is such that the tubular housing 31 may oscillate about the axis of pins 33. It can readily be seen that the support for the housing 31 adjacent its end is adapted for universal movement, the rockable frame 30 being capable of oscillation about pins 29 and the tubular member 31 being rockable in a horizontal plane about the pins 33.

The upper portion of the housing 1 is provided with an aperture 36, Fig. 1, through which an end of housing 31 projects. The projecting end of housing 31 is of relatively enlarged diameter as shown best at 37 in Fig. 4. The end of the housing 37 carries a ball bearing assembly 38. Adjacent the opposite end of the tubular member 31 a ball bearing assembly 39 is carried, said assemblies being adapted for the rotatable support of shaft 9. A drum 40 is rigidly carried upon shaft 9 exteriorly of casing 1.

Tubular member 31 adjacent its inner end carries a spider 41 the arms of which extend rearwardly and terminate in boss 42. Boss 42 is internally threaded to a tubular spacing member 43. A rod 44 is positioned within the tubular spacing member 43 and at one end thereof is threaddedly engaged with hub 45 which carries a disc 46. The opposite end of the rod 44 terminates in a hex head 47.

A frame 48, Fig. 5, is secured by means of screws 49 to the supporting partition 8. The frame 48 is essentially inverted U-shaped and carries a plurality of oppositely spaced lugs 50 upon which the ends of coil springs 51 are anchored. The coil springs 51 are arranged in adjacent pairs, the pairs of springs being spaced substantially 90° from each other throughout the length of the frame 48. The opposite ends of the springs 51 are anchored to a washer 52 which embraces rod 44.

It can readily be seen that the housing 31, tubular spacing member 43 and rod 44 comprises a rigid structure, the spacing member 43 and tubular member 31 being joined together by the arms of the spider 41. The support for this rigid assembly comprises the yoke 24 which engages with the tubular member 31 in the manner hereinbefore described. At the opposite end of the rigid structure, the structure is supported by the inverted U-shaped frame 48 through the agency of the coil springs 51. As has been hereinbefore described, one end of the rigid structure comprising the tubular member 31 and the spacer member 43 is supported in a substantially universal carriage comprising yoke 24 and the rockable frame 30 and the opposite end of the rigid structure is supported in floating relationship upon the springs 51. As will be hereinafter more fully described when a rotating body such as an automobile wheel is positioned upon the shaft 9 and said body is rotated by means of contact with the spinning pulley 23, the shaft 9 will rotate with the wheel. If the wheel is unbalanced, such unbalance will be evidenced by a wobbling motion of the rigid structure comprising the tubular member 31 and the spacing member 43, the wobbling motion being accommodated by the universal support at one end of the rigid structure and the floating support at the opposite end thereof.

Intermediate the length of the tubular member 31 a bar 53, Fig. 8, is carried, said bar being secured by means of screws 54 to boss 55 formed rigid with the tubular member 31. An intermediate portion of the bar 53 extends diagonally downwardly and carries at its lowermost end a socket portion 56. A supporting bracket 57 is secured to the supporting partition 8 by means of screws 58, said supporting bracket having an upwardly extending portion 59. A member 60 is threadedly positioned in the upwardly extending portion 59 of the bracket 57, said member carrying at one end a ball 61 and at the opposite end said member is provided with a screw driver slot 62. A lock nut 63 functions to lock the member 60 in a desired position upon the upstanding portion 59 of the bracket 57.

Briefly described, the oscillations or wobble of the rigid structure comprising tubular member 31 and spacer 43 is reduced to the making and breaking of the primary circuit of an induction coil. To accomplish this end, a ball 64 is carried by the socket 56 and an outer tube 65 having an open end, is seated upon the ball 64. An inner tube 66 is slidably positioned within a portion of the outer tube 65 and a coil spring 67 is positioned within the inner tube 66. A plug or point carrier 68 is rigidly positioned within the inner tube 66 and one end of coil spring 67 abuts against said plug. A second plug 69 is rigidly mounted within the outer tube 65 adjacent ball 64, the opposite end of coil spring 67 abutting against plug 69 to urge the inner tube away from the ball-end of the outer tube.

Adjacent the opposite end of the outer tube 65 a second inner tube 70 is telescopically positioned, one end of the latter seating upon ball 61. A coil spring 71 is positioned within the inner tube 70 and abuts, at one end, against a lug 72, struck inwardly from the wall of the inner tube 70. The outer tube 65 is provided with a notched opening 73 intermediate its length and the end of inner tube 70 is cut away adjacent said notch. An abutment strap 74 is carried upon the outer wall of the outer tube 65 and projects downwardly into notch 73 to serve as an abutment for the opposite end of spring 71. In this fashion the outer tube 65 is urged away from the ball-end of inner tube 70.

A bus bar 75 is mounted upon the outer wall of outer tube 65, said bar being insulated from the outer tube by insulator 76. An end of bus bar 75 extends downwardly through notch 73 into the interior of the tube 65 and carries therein an adjustable contact point 76. Similarly, a companion contact point 77 is carried upon plug 68. A conductor 78 connects bus bar 75 to the primary coil (not shown) of a conventional spark coil 79 carried upon partition 8 by means of a strap 80. The opposite end of the primary coil is grounded upon the frame of the machine through a source of electric current (not shown). Contact point 77 is also grounded.

When the rotating body such as an automobile wheel is rotated with shaft 9 and said wheel is unbalanced, the tubular member 31 and hence bar 53 moves in response to the unbalance of the wheel. The movement of the rigid structure comprising the tubular member 31 and spacer 43 is essentially a circular movement, the socket end 56 of the bar 53 describing a circle of relatively small radius. By the provision of the balls 61 and 64 and the resilient relationship of the tubes 65 and 70, said circular movement is accompanied by a telescopic movement of the tubes 65 and 70. In effect, the movement resolves itself into a separation and a coming together of balls 61 and 64 and in effect the tubes 65 and 70 considered as a whole lengthen and shorten. During this movement the contact points 76 and 77 break and make contact as the tubes effectively lengthen and shorten respectively. To adjust the breaker arrangement hereinbefore described the member 60 may be manipulated to move the ball 61 toward or away from the ball 64. This constitutes a relatively coarse adjustment of the device. A fine adjustment is accomplished by the mechanism hereinafter described.

An anchor block 81 is mounted upon the plate 8 and is provided with internal threads 82. A hollow screw 83 carries external threads 84 which engage with the internal threads 82 of the block 81. The screw 83 is provided with internal threads which engage with the external threads 85 of a screw 86, the screw 86 being threaded into the upwardly extending member 59 of the bracket 57 and said screw being locked rigidly upon said bracket by means of nut 87. The external threads 84 of the hollow screw 83 are pitched in the same direction as the threads 85 of the screw 86, but the pitch of threads 84 and 85 is different. The arrangement constitutes a differential screw arrangement in which a relatively small movement of high mechanical advantage may be secured. The upstanding portion 59 of the bracket 57 is relatively rigid but is capable of being sprung when sufficient force is brought to bear thereagainst. Consequently, in view of the fact that the screw 86 is rigidly locked upon the bracket 57 manipulation of the screw 84 results in a relatively fine motion of the differential screw arrangement, the mechanical advantage of which is such as to be sufficient to spring the member 59 toward or away from the socket member 56. In this manner a relatively fine adjustment can be made of the effective length of the tubes 65 and 70 and the breaker points 76 and 77 may be adjusted to separate at a desired degree of movement of the socket member 56. As has been hereinbefore described the breaker points 76 and 77 are connected in series with a source of E. M. F. and the primary coil of the induction coil 79 and hence during rotation of a wheel which may be unbalanced the circuit to the primary coil is periodically completed and broken during each revolution of the shaft 9.

A disc 88, Figs. 4 and 7, constructed of insulating material such as fiber, hard rubber, plastic or the like is mounted upon the end of the tubular housing 31 by means of screws 89. The disc 88 is provided with a plurality of circumferentially spaced radially extending recesses 90 which open at the periphery of the disc. A conductor 91 extends into each of the recesses 90, the end of each of said conductors extending laterally through the face of the disc as indicated at 91' in Figs. 4 and 7. As will be hereinafter more fully described, the conductors 91 connect with an indicator 92, Figs. 3, 12 and 13, said indicator being mounted upon a control panel 94 which is positioned upon the housing 1 and extends through the top 4 whereby it may be observed by an operator.

A disc 95 is mounted upon an end of shaft 9, said disc being constructed of an insulating material similar to the disc 88. The disc 95 is rigidly carried by the shaft 9 and rotation of said shaft rotates said disc. An electrically conducting material 96 is mounted upon the periphery of the disc, said material being preferably a metal strip. A finger 97, constructed of metal is electrically connected to the strip 96 and extends laterally from the disc 95 toward disc 88, the arrangement being such that when shaft 9 is rotated carrying disc 95 therewith, the finger 97 moves closely adjacent the ends 91' of the conductors 91 which project through the lateral wall of the disc 88. As will be hereinafter more fully described, the finger 97 carries a pulse of high voltage electricity and consequently it is not necessary for the end of said finger to make physical contact with the ends 91' of the conductors 91 since when said pulse occurs a spark will jump from the finger 97 to an adjacent terminal 91'. As has been hereinbefore described, the primary coil of induction coil 79 is periodically broken which sets up a high voltage current in the secondary coil of said induction coil. Conductor 98 indicates the ungrounded end of the secondary coil of the induction coil and said conductor terminates as at 99 in Fig. 3 adjacent the conducting rim 96 carried upon the disc 95. The conductor 98 is secured by strap 100 to one of the arms 41 so that the terminal 99 may be fixed in position adjacent the rim 96. The terminal 99 of the conductor 98 is spaced from the rim 96 in view of the fact that the high voltage current will jump from the terminal 99 to the rim 96 when the primary is opened.

As has been hereinbefore described, when an unbalanced wheel is mounted upon shaft 9 and is rotated said wheel causes the tubular member 31 to oscillate and this oscillation results in a making and breaking of the contact at the contact points 76 and 77. Hence, at a predetermined phase of rotation of the wheel the contact points 76 and 77 will be separated and the primary circuit of coil 79 will be opened. The opening of the primary circuit sets up a high voltage current in the secondary circuit and a spark will jump from terminal 99 to rim 96. Substantially simultaneously therewith a spark will jump from the finger 97 to one of the terminals 91' of one of the conductors 91. Hence when the tubular member 31 so moves as to open the primary circuit of the coil 79 one of the conductors 91 will be energized. Accordingly, depending upon the conductor 91 which has been energized, the position of the unbalanced portion of the wheel being tested may be ascertained by mechanism hereinafter more fully described.

Referring particularly to Figs. 12 and 13, indicator 92 comprises a metallic disc 101 which is secured to non-metallic disc 104 by means of screw 103. Disc 104 is constructed of an electrical insulating material such as hard rubber, plastic, hard fiber, or the like. Disc 104 is provided with a plurality of circumferentially spaced transverse apertures 105 into each of which a conductor 91 extends, the number of apertures 105 corresponding to the number and position of said conductors 91 relative to recesses 90 in disc 88. The end of each conductor 91 in each recess in connected to a spark point 106 which extends from the periphery of disc 104. Disc 101 is provided with a plurality of circumferentially spaced apertures 107 through each of which a pair of spark points 106 are visible. Indicia (0 to 9) is inscribed upon the face of disc 101 corresponding in circumferential position and in radial alignment with corresponding spark points 106 upon disc 104.

The arrangement is such that when a predetermined conductor 91 is energized, a spark will jump from the corresponding spark point 106 to the surrounding surface of the metallic control panel 94. As has been hereinbefore described, the spark points 106 correspond in number and position to the recesses 90 in the disc 88. Hence, if finger 97 is energized when it is adjacent the terminal 91' at "twelve o'clock" upon disc 88, a spark will jump from spark point 106 to the surrounding edge of the control panel 94 under the indicia "0" of disc 101.

To further correlate the indications, the periphery of drum 40 is inscribed with indicia 108 which corresponds in number and position to the number and position of the recesses 90 in disc 88. Accordingly, if an unbalanced wheel is tested, the points 76 and 77 will separate when the unbalanced portion of the wheel is at a predetermined phase of its revolution, that is, when shaft 9 and, hence, finger 97 is at a predetermined phase of its revolution. This phase is identified upon indicator 92 by reference to the sparking point 106 relative to the indicia on the disc 101. The spark, for a given unbalanced wheel, will continuously occur at a predetermined indicia as the wheel rotates. At the corresponding indicia 108 upon drum 40 the angular position of unbalance may be located upon the tested wheel.

The sensitiveness of the device depends essentially upon the effective length of the tubes 65 and 70, that is, the distance between the balls 61 and 64. As this distance increases the device, for a predetermined rate of rotation becomes less sensitive since the distance that the tube 70 must travel before it strikes the tube 66 and thereby opens the spark points 76 and 77 is greater. When they are set properly for the correct sensitivity there will be about .001 inch clearance between the end of tube 70 and the end of tube 66.

As one of the features of our invention, it will be noted that, the wheel under test and shaft 9, after it has been rotated at a desired speed and after pulley has been disengaged from the tire, rotate freely with substantially no frictional resistance other than that offered by bearings 38 and 39 and, hence, substantially no forces inherent in the device itself affect the indication of balance of the wheel being tested. A more sensitive and accurate determination of balance can thereby be obtained.

The angular position of dynamic unbalance is obtained in the manner hereinbefore described. In order to ascertain the degree of unbalance the following described mechanism is employed.

Upon the end of shaft 9 adjacent disc 95 a second disc 110 is carried, said disc being affixed to shaft 9 and being rotatable therewith. The disc 110 is constructed of a non-magnetic material and preferably a material such as hard rubber, synthetic plastic, hard fiber or the like. Permanent magnets 111 are positioned in disc 110 and are circumferentially spaced from each other. For purposes of illustration four such magnets are employed. However, it is to be understood that a greater number of magnets may be used, if desired. The magnets may be disposed in the disc 110 so as to have all of their like poles face the same side of the disc.

Secured to disc 46 are four solenoids 112, each of said solenoids having a ferromagnetic core 113. It can readily be seen that disc 46 being mounted upon shaft 44 is stationary and the solenoids 112 are positioned in adjacent relationship to the permanent magnets 111, the cores 113 being on the same circumference as the magnets 111. With the polarity of magnets 111 such that all of the magnets have the same pole at the same face of the disc 110 all of the coils 112 will be wound in the same direction but the current will be passed through the coils alternately in opposite directions.

The arrangement is such that when shaft 9 is rotated the permanent magnets 111 move past the ends of the cores 113 and alternating E. M. F. is generated in the coils 112.

Referring particularly to Fig. 14 a wiring diagram including the coils 112 is illustrated. It will be noted that all of the coils 112 are connected in series, with alternate coils reversely connected, that is, with all of the coils wound in the same direction the current in alternate coils is in opposite directions, so that the E. M. F. generated in all of the coils is additive. Reference numeral 114 indicates a conventional rectifier bridge and conductor 115 connects coils 112 to one corner of the bridge, the opposite corner of the bridge is connected by means of conductor 116 to rheostats 117 and 118 which are connected in series, the rheostat 118 being connected to the endmost coil 112. An electric meter 119 is connected by means of conductors 120 and 121 to the remaining opposite corners of the rectifier bridge 114 whereby the alternating current generated in coils 112 and controlled by the rheostats 117 and 118 may be read upon the meter 119 in terms of direct current.

When the housing 31 vibrates due to dynamic unbalance of the wheel being tested, the extent or amplitude of such vibration is proportional to the degree of unbalance of the wheel and the rate of rotation of the shaft 9. In some forms of balancing machines heretofore proposed the shaft carrying the wheel under test was rotated at a constant speed and the amplitude of vibration of the shaft was measured. This arrangement, however, necessitates that the wheel be driven at a constant speed which implies that the shaft upon which the wheel is mounted must be positively connected to a prime mover of some description.

This type of connection tends to introduce inherent errors in the measurement of unbalance since the body under test is not a freely rotating body but is continuously influenced by its connection to the prime mover.

In the present invention it will be noted that the shaft 9 is initially rotated at a predetermined speed and thereafter the rotation of shaft 9 depends upon the momentum or inertia of the rotating body, said shaft and rotating body revolving freely. In carrying out the present invention to measure the degree of unbalance, the measurement of such degree of unbalance is taken when the amplitude of vibration of the housing 31 reaches a predetermined value. This operation is accomplished as follows:

With a predetermined constant setting of the gap between the points 76 and 77 by means of the screw member 60 and the differential screw arrangement comprising screws 83 and 86, the body under test is rotated until it reaches a predetermined rotational speed. Thereafter, the pulley 23 is disengaged from the tire and the body is permitted to rotated freely with shaft 9. As the rotation proceeds a spark will be observed upon the indicator 92, said spark jumping from spark point 106 to the edges of the disc 101 adjacent one of the indicia upon said disc. As has been hereinbefore described this locates the angular position of unbalance of the body. As rotation proceeds and the body begins to decelerate, the amplitude of vibration of the housing 31 decreases. During the rotation of the shaft 9 an E. M. F. is established in coils 112 and the effective current is measured upon the meter 119. As the shaft 9 decelerates the current passing through meter 119 decreases since the E. M. F. generated is proportional to the rate of rotation of the permanent magnets 111 with respect to the coils 112. At a predetermined point, determined by the presetting of the spark points 76 and 77 the spark which jumps from spark point 106 to the disc 101 will cease inasmuch as the amplitude of vibration of the housing 31 will not be sufficient to cause points 76 and 77 to break contact with each other. At the instant that the spark upon the indicator 92 ceases a measurement is observed upon the meter 119 which is an indication of the degree of unbalance of the rotating body. The meter 119 may be calibrated in terms of ounces and hence the operator will be given information as to the amount of weight which must be added to the body at a predetermined angular position thereon in order to properly balance the body.

The rheostat 117 connected in series with the coils 112 may function as a calibrating rheostat which may be employed to correlate the position of the points of the meter 119 with respect to known conditions of unbalance. The rheostat 118 may be manipulated by knob 122 upon the instrument panel 94 and said rheostat may change the range of the readings upon the meter 119 in predetermined steps.

The meter 119 is adapted to indicate to the operator the weight, preferably in ounces, which must be positioned upon the rim of an automobile wheel in order to dynamically balance the wheel. However, the amplitude of vibration of a rotating wheel due to dynamic unbalance is a function of not only the absolute weight of unbalance but the product of said absolute weight and the moment arm upon which said weight acts. The moment arm is the distance between the weight and the central plane of the wheel at right-angles to its axis of rotation. Hence, when meter 119 indicates that a one ounce weight is to be added to dynamically balance the wheel, the calibration of the meter must take into account the distance that the added weight is to be placed from said central plane of the wheel. In other words, the calibration of the meter 119 must take into account the width of the tire carried by the wheel since the width determines the moment arm upon which the compensating added weight acts.

Accordingly, the rheostat 118 is employed to change the range of the meter in terms of tire widths. For a relatively wide tire, resistance is taken out of the meter circuit so that the indicated current is higher for a predetermined amplitude of unbalance, and for a relatively narrow tire resistance is added. In this fashion, for a predetermined setting of rheostat 118 the proper weight for a tire of predetermined width is indicated upon the meter.

It can be seen that the weight indications on the meter are inversely proportional to the current passing through the meter for a predetermined setting of the rheostat 118. That is, for a wheel which is greatly unbalanced, the sparking at the indicator 92 will persist for a lower rotational speed than where the wheel is only slightly unbalanced. Hence, when the sparking ceases the rotational speed, and hence the current through the meter, will be less in the former case than in the latter.

The knob 122 (Fig. 3) operates over a dial which carries points 123. In view of the fact that commercial tire width fall within fairly definite ranges, the resistance values on rheostat 118 for the points 123 can be readily ascertained within practical ranges of accuracy for automotive wheel balancing.

In employing the present machine for testing static unbalance the spinning pulley 23 is not used. The body to be tested is merely mounted upon shaft 9 and it is permitted to move in whichever direction the unbalanced portion of the wheel determines. Of course, the heaviest part of the wheel will tend to move toward the lowest position. It can readily be seen that in determining static unbalance the shaft 9 moves freely within the bearings 38 and 39. When determining dynamic unbalance substantially the same condition obtains inasmuch as the magnetic force established by the magnets 111 is so relatively small as to be negligible and hence shaft 9 carrying the body being tested will move substantially as a freely rotating body. Normally, when the position and the degree of dynamic unbalance is ascertained a weight of the amount indicated by the meter 119 will be placed upon one side of the rim of the wheel at the angular position indicated by the indicia 108. A similar weight of the amount indicated by the meter 19 will be placed upon the opposite side of the rim and removed 180° angularly from the first applied weight. In this fashion a dynamically unbalanced wheel may be balanced without impairing the static balance of the wheel.

We claim as our invention:

1. In a machine for testing the condition of balance of a rotating body, a frame, a freely rotating shaft for carrying the body under test, means for rotating said shaft and body, means for disengaging said rotating means to permit said shaft and body to rotate under their own momentum at a declerating rate, means for supporting said shaft upon said frame to permit limited lateral movement of a portion of said shaft when the shaft rotates with a carried unbalanced body, electrical contact means carried by said shaft-supporting means and said frame for establishing a visual spark signal in timed relationship to periodic lateral movement of said shaft-carrying means in a predetermined direction while said shaft and body are decelerating, and means for measuring the rate of rotation of said shaft when said shaft-supporting means moves laterally a predetermined distance in said predetermined direction, said measuring means being calibrated in terms of the unbalanced weight of said body.

2. In a machine for testing the condition of balance of a rotating body comprising, a stationary frame, a shaft-supporting means mounted on said frame for limited oscillatory movement with respect to said frame, a rotatable shaft carried by said shaft-supporting means and oscillatorily movable therewith for carrying a body under test, means for rotating said shaft and body, means for disengaging said rotating means after said shaft and body have been rotated at a predetermined speed to cause the rotation of said shaft and body to thereafter decelerate, a visual signal carried by said frame, means mounted upon said frame and shaft-supporting means for actuating said visual signal when said shaft-supporting means oscillates above a predetermined minimum amplitude when an unbalanced body is carried on said decelerating shaft, means carried by said shaft and shaft supporting means for generating an electric current in proportion to the rate of rotation of said shaft, and means connected to said generating means for measuring the current generated.

3. In a machine for testing the condition of balance of a rotating body comprising, a stationary frame, a shaft-supporting means mounted on said frame for limited oscillatory movement with respect to said frame, a rotatable shaft carried by said shaft-supporting means and oscillatorily movable therewith for carrying a body under test, means for rotating said shaft and body, whereby oscillatory movement is imparted to said shaft-supporting means when said body is unbalanced, means for disengaging said rotating means to permit said shaft and body to freely rotate under their own momentum at a decelerating rate, means carried by said frame and shaft-supporting means for alternately making and breaking an electrical circuit when said shaft-supporting means oscillates, means carried by said frame for adjusting said make and break means to permit making and breaking of said circuit at and above a predetermined amplitude only, visual means connected in said circuit for giving a visual signal when said circuit is alternately made and broken, and means for measuring the rate of rotation of said shaft to determine the rate of rotation of said shaft when the amplitude of the shaft-supporting means becomes a predetermined amount less than said first-mentioned predetermined amplitude.

4. In a machine for testing the condition of balance of a rotating body comprising, a stationary frame, a shaft supporting means mounted on said frame for limited lateral movement, a rotatable shaft carried by said shaft-supporting means and laterally movable therewith for carrying a body under test, means for rotating said shaft and body whereby lateral movement is imparted to said shaft-supporting means when said body is unbalanced, means for disengaging said rotating means to permit said shaft and body to freely rotate under their own momentum, a mechanism for completing and breaking an electrical circuit, said mechanism comprising a pair of contact points, means carried by said shaft-supporting means and means carried by said frame between which said mechanism is carried, resilient means for holding said points in contact when said shaft-supporting means is laterally stationary, said mechanism carrying means for separating said contact points when said shaft support means moves laterally a predetermined amount, a visual signal connected in circuit with said contact points whereby said signal is actuated when said contact points alternately make and break said circuit when said shaft-supporting means moves laterally, and is deactuated when said contact points remain in contact with each other, and means for measuring the rate of rotation of said freely rotating shaft.

References Cited in the file of this patent

UNITED STATES PATENTS

| Number | Name | Date |
|---|---|---|
| 728,315 | Snell | May 19, 1903 |
| 1,293,984 | Thompson | Feb. 11, 1919 |
| 1,929,259 | Rich | Oct. 3, 1933 |
| 2,043,618 | Havill | June 9, 1936 |
| 2,196,031 | Schildmeier | Apr. 2, 1940 |
| 2,341,141 | Greenleaf et al. | Feb. 8, 1944 |
| 2,412,473 | Schnoebelen | Dec. 10, 1946 |
| 2,491,603 | Brooks | Dec. 20, 1949 |
| 2,559,707 | Burke et al. | July 10, 1951 |
| 2,565,577 | Schnoebelen | Aug. 28, 1951 |